(12) United States Patent
Yang et al.

(10) Patent No.: US 9,635,610 B2
(45) Date of Patent: Apr. 25, 2017

(54) UPLINK POWER CONTROL SIGNALING WITH CARRIER AGGREGATION

(75) Inventors: Rongzhen Yang, Shanghai (CN); Jong-Kae Fwu, Sunnyvale, CA (US); Huaning Niu, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 13/997,221

(22) PCT Filed: Apr. 11, 2012

(86) PCT No.: PCT/US2012/033014
§ 371 (c)(1),
(2), (4) Date: Jun. 5, 2014

(87) PCT Pub. No.: WO2013/048570
PCT Pub. Date: Apr. 4, 2013

(65) Prior Publication Data
US 2015/0351039 A1    Dec. 3, 2015

Related U.S. Application Data

(60) Provisional application No. 61/542,086, filed on Sep. 30, 2011.

(51) Int. Cl.
*H04W 52/04*  (2009.01)
*H04B 7/06*   (2006.01)
(Continued)

(52) U.S. Cl.
CPC ........ *H04W 52/0222* (2013.01); *H04B 7/024* (2013.01); *H04B 7/0417* (2013.01);
(Continued)

(58) Field of Classification Search
CPC ............. H04W 52/221; H04W 52/242; H04W 52/346; H04W 52/246; H04W 72/0473; H04W 72/0426; H04W 72/042
See application file for complete search history.

(56) References Cited

U.S. PATENT DOCUMENTS 8,995,376 B2 * 3/2015 Pan .................. H04L 5/001
370/329
2010/0302983 A1 * 12/2010 McBeath .............. H04L 5/0005
370/311
(Continued)

FOREIGN PATENT DOCUMENTS

CN    101778462 A    7/2010
CN    101841892 A    9/2010
(Continued)

OTHER PUBLICATIONS

International Search Report and Written Opinion received for PCT application No. PCT/US2012/033014, mailed on Aug. 30, 2012, 10 pages.
(Continued)

*Primary Examiner* — Rasheed Gidado
(74) *Attorney, Agent, or Firm* — Thorpe North & Western

(57) ABSTRACT

Technology for providing uplink power control signaling for semi-persistent scheduling with carrier aggregation is disclosed. One method comprises receiving a transmitter power control (TPC) carrier aggregation (CA) physical downlink control channel (PDCCH) configuration information element (IE) identifying a location of information to adjust an uplink power control of a selected component carrier of the UE using semi-persistent scheduling. The TPC-CA-PDCCH configuration IE includes a carrier index value for the selected component carrier of the UE to allow a power level of the selected component carrier to be individually adjusted. A power level of a physical uplink shared channel
(Continued)

and/or a physical uplink control channel can be adjusted for the selected component carrier.

17 Claims, 6 Drawing Sheets

(51) Int. Cl.
| | |
|---|---|
| H04W 52/02 | (2009.01) |
| H04W 48/16 | (2009.01) |
| H04B 7/0456 | (2017.01) |
| H04L 12/891 | (2013.01) |
| H04L 5/00 | (2006.01) |
| H04W 72/04 | (2009.01) |
| H04W 4/08 | (2009.01) |
| H04W 36/00 | (2009.01) |
| H04W 28/04 | (2009.01) |
| H04W 4/06 | (2009.01) |
| H04W 72/00 | (2009.01) |
| H04W 72/12 | (2009.01) |
| H04W 76/04 | (2009.01) |
| H04L 12/709 | (2013.01) |
| H04W 48/18 | (2009.01) |
| H04W 72/08 | (2009.01) |
| H04W 76/06 | (2009.01) |
| H04B 7/024 | (2017.01) |
| H04B 7/0417 | (2017.01) |
| H04W 52/14 | (2009.01) |
| H04W 84/04 | (2009.01) |
| H04W 52/54 | (2009.01) |
| H04L 12/18 | (2006.01) |
| H04L 25/02 | (2006.01) |
| H04W 28/10 | (2009.01) |
| H04W 52/24 | (2009.01) |
| H04W 52/36 | (2009.01) |
| H04W 48/12 | (2009.01) |

(52) U.S. Cl.
CPC ......... *H04B 7/0456* (2013.01); *H04B 7/0615* (2013.01); *H04B 7/0619* (2013.01); *H04L 5/0032* (2013.01); *H04L 5/0037* (2013.01); *H04L 45/245* (2013.01); *H04L 47/41* (2013.01); *H04W 4/06* (2013.01); *H04W 4/08* (2013.01); *H04W 28/042* (2013.01); *H04W 36/0005* (2013.01); *H04W 48/16* (2013.01); *H04W 48/18* (2013.01); *H04W 52/0235* (2013.01); *H04W 52/04* (2013.01); *H04W 52/146* (2013.01); *H04W 72/005* (2013.01); *H04W 72/042* (2013.01); *H04W 72/0446* (2013.01); *H04W 72/082* (2013.01); *H04W 72/1215* (2013.01); *H04W 72/1278* (2013.01); *H04W 72/1294* (2013.01); *H04W 76/048* (2013.01); *H04W 76/064* (2013.01); *H04B 7/0613* (2013.01); *H04L 12/189* (2013.01); *H04L 25/0204* (2013.01); *H04W 28/10* (2013.01); *H04W 48/12* (2013.01); *H04W 52/244* (2013.01); *H04W 52/365* (2013.01); *H04W 52/54* (2013.01); *H04W 72/0426* (2013.01); *H04W 84/042* (2013.01); *Y02B 60/50* (2013.01)

(56) References Cited

U.S. PATENT DOCUMENTS

| | | | |
|---|---|---|---|
| 2011/0038271 A1 | 2/2011 | Shin et al. | |
| 2011/0081936 A1* | 4/2011 | Haim | H04W 52/367 455/522 |
| 2011/0086659 A1 | 4/2011 | Yoon et al. | |
| 2011/0105173 A1 | 5/2011 | Haim et al. | |
| 2011/0243087 A1* | 10/2011 | Ahn | H04W 52/146 370/329 |
| 2011/0250918 A1* | 10/2011 | Jen | H04W 52/08 455/509 |
| 2012/0009923 A1* | 1/2012 | Chen | H04L 5/0091 455/434 |
| 2012/0087317 A1* | 4/2012 | Bostrom | H04W 52/30 370/329 |
| 2012/0224553 A1* | 9/2012 | Kim | H04W 52/54 370/329 |

FOREIGN PATENT DOCUMENTS

| | | |
|---|---|---|
| KR | 10-2011-0097900 A | 8/2011 |
| WO | WO 2010/074504 A2 | 7/2010 |
| WO | WO 2010/091425 A2 | 8/2010 |
| WO | 2013/048570 A1 | 4/2013 |

OTHER PUBLICATIONS

ETSI TS 136 212, "LTE; Evolved Universal Terrestrial Radio Access (E-UTRA); Multiplexing and Channel Coding", 3GPP TS 36.212, Jun. 2011, pp. 80, V 10.2.0, Release 10, France.

Search Report for European application 12838065 dated Sep. 23, 2015, 11 pages.

* cited by examiner

```
-- ASN1START

TPC-CA-PDCCH-Config ::=            CHOICE {
    release                    NULL,
    setup                      SEQUENCE {
        tpc-RNTI                   BIT STRING (SIZE (16)),
        tpc-CA-Index               TPC-CA-Index
        }
}

TPC-CA-Index ::=                   CHOICE {
    CID-indexOfFormat3             INTEGER (1..15),
    CID-indexOfFormat3             INTEGER (1..15),
    ......
    CID-indexOfFormat3A            INTEGER (1..31)
    CID-indexOfFormat3A            INTEGER (1..31)
    ......
}

-- ASN1STOP
```

FIG. 3

UPLINK POWER CONTROL SIGNALING WITH CARRIER AGGREGATION

BACKGROUND

The use of wireless communication devices continues to become more ubiquitous in modern societies. The substantial increase in the use of wireless devices is driven, in part, by the devices' increasing abilities. While wireless devices were once used only to communicate voice and text, their ability to display audiovisual presentations has driven the need to be able to transmit and receive pictures, information related to games, television, movies, and so forth.

One way of increasing the amount of data that can be communicated is through the use of carrier aggregation. Carriers are signals in permitted frequency domains onto which information is placed. The amount of information that can be placed on a carrier is determined by the carrier's bandwidth. The permitted frequency domains are often limited in bandwidth, especially when there are a large number of users that are simultaneously using the bandwidth in the permitted frequency domains.

Carrier aggregation enables multiple carrier signals to be simultaneously communicated between a user's wireless device and a base station. Multiple different carriers can be used. In some instances, the carriers may be from different permitted frequency domains. This provides a broader choice to the wireless devices, enabling more bandwidth to be obtained. The greater bandwidth can be used to communicate bandwidth intensive operations, such as streaming video or large data files.

Various wireless standards have been drafted that enables wireless communication devices to be interoperable. However, the wireless standards are not complete in defining the information that needs to be exchanged between wireless devices and base stations to allow carrier aggregation to take place in a mobile wireless communication system.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 3 illustrates an Abstract Syntax Notation 1 (ASN.1) depicting an information element in accordance with an example;

Figure 1A:
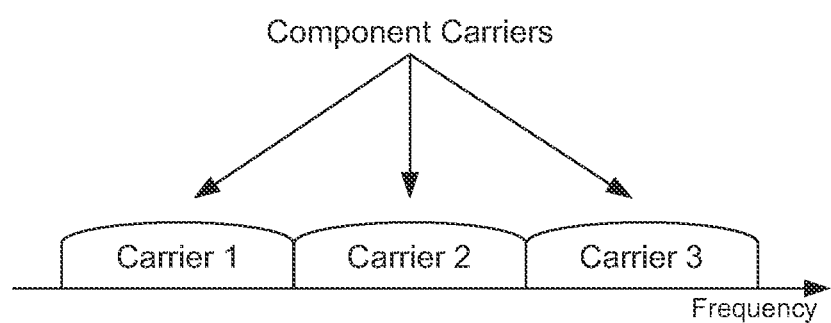
FIG. 1a illustrates carrier aggregation of continuous component carriers in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

Uplink transmission power is one of the key methods to optimize uplink performance in a wireless communication system. In a cellular type of wireless network, an uplink involves transmitting from a wireless device to a network node (i.e. base station). The ability to efficiently transmit data results in a longer battery life and the ability to transmit and receive more data for portable devices.

In the third generation partnership project (3GPP) long term evolution (LTE) Rel. 10 (Mar. 23, 2011), the transmission power is specified based on a power control algorithm referred to as transmitter power control (TPC). A network node is referred to as an evolved universal terrestrial radio access network (E-UTRAN) NodeB (eNB or eNodeB). A wireless device is referred to as user equipment (UE).

The TPC contains two parts, an open loop power control and close loop power control. The open loop power control factor can be used to set the basic operating point for TPC. The open loop power control factor can be sent by an eNodeB to the using a medium access control (MAC) protocol sublayer communication to the UE. The closed loop power factor does finer and much quicker adjustments. The closed loop power factor can be sent through a control channel, such as the physical downlink control channel (PDCCH), which includes a field for TPC adjustments. In some situations, there is no uplink scheduling on the control channel, or no uplink grant. When this occurs, then an alternative medium exists to communicate the TPC adjustments from the eNodeB to the UE.

Specifically, downlink control information (DCI) carried on the PDCCH includes two specific formats, format 3 and 3A, to carry the TPC information to allow the transmit power from the UE to be frequently adjusted. DCI formats 3 and 3A are defined in 3GPP LTE Technical Specification (TS) 36.212 Ver. 10, which is publicly available.

In some embodiments, TPC can be used to adjust power on a subframe by subframe basis to ensure that a substantially minimum necessary power is used to transmit the data in each subframe, thereby optimizing the power usage and maximizing the length of battery usage between charges. At each subframe, transmit power can be incremented or decremented based on a TPC value communicated from the eNodeB to the UE via the PDCCH.

Semi-persistent scheduling (SPS) is a feature that significantly reduces control channel overhead for applications that require persistent radio resource allocations, such as voice over internet protocol (VOIP). In the LTE specification both the downlink and uplink are fully scheduled since the downlink and uplink traffic channels are dynamically shared channels. To accomplish the dynamic sharing, the PDCCH provides access grant information to identify which users should decode data in the physical downlink shared channel (PDSCH) in each subframe, and which users are permitted to transmit on the physical uplink shared channel (PUSCH) each subframe.

With SPS, every downlink or uplink physical resource block (PRB) allocation is granted via an access grant message on the PDCCH. Many types of applications have large packet sizes, meaning that only a few users are scheduled each subframe. However, for applications that use persistent allocations of small packets, such as VOIP, the access grant control channel overhead can be significant.

To reduce the amount of overhead that can occur with applications that use persistent allocations of small packets, a persistent physical resource block (PRB) allocation is introduced in SPS. The UE can expect the persistent PRB allocation on the downlink transmission received at the UE. The UE can also use persistent PRB allocations for uplink transmissions.

The use of SPS can significantly reduce the amount of overhead. However, the use of the persistent PRB allocations means that there is often no uplink scheduling on the control channel, or no uplink grant. Therefore, the TPC information can be carried in DCI format 3 or 3A.

One way of increasing the amount of data that can be communicated is through the use of carrier aggregation. Carriers are signals in permitted frequency domains onto which information is placed. The amount of information that can be placed on a carrier is determined by the carrier's bandwidth. The permitted frequency domains are often limited in bandwidth. The bandwidth limitations become more severe when a large number of users are simultaneously using the bandwidth in the permitted frequency domains.

Carrier aggregation enables multiple carrier signals to be simultaneously communicated between a user's wireless device and a base station. Multiple different carriers can be used. In some instances, the carriers may be from different permitted frequency domains. This provides a broader choice to the wireless devices, enabling more bandwidth to be obtained. The greater bandwidth can be used to communicate bandwidth intensive operations, such as streaming video or large data files.

FIG. 1a illustrates an example of carrier aggregation of continuous carriers. In the example, three carriers are contiguously located along a frequency band. Each carrier can be referred to as a component carrier. In a continuous type of system, the component carriers are located adjacent one another and are typically located within a single frequency band. A frequency band is a selected frequency range in the electromagnetic spectrum. Selected frequency bands are designated for use with wireless communications such as wireless telephony. Certain frequency bands are owned or leased by a wireless service provider. Each adjacent component carrier may have the same bandwidth, or different bandwidths. A bandwidth is a selected portion of the frequency band. Wireless telephony has traditionally been conducted within a single frequency band.

Figure 1B:
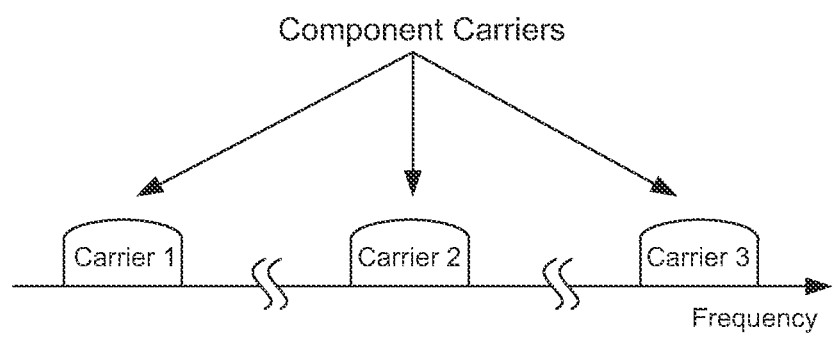
FIG. 1b illustrates carrier aggregation of non-continuous component carriers in accordance with an example.

FIG. 1b illustrates an example of carrier aggregation of non-continuous component carriers. The non-continuous component carriers may be separated along the frequency range. Each component carrier may even be located in different frequency bands. The ability to use component carriers in different frequency bands enables greater communication speeds and more efficient use of available bandwidth.

Figure 2:
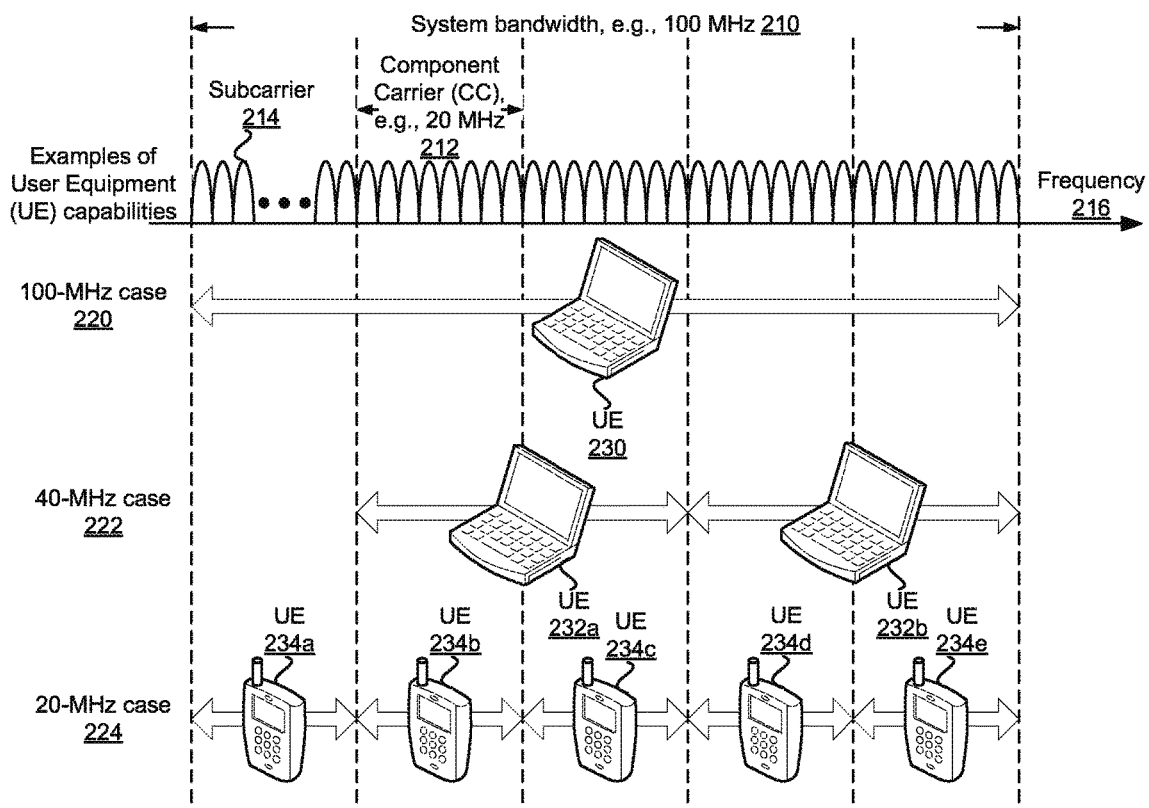
FIG. 2 illustrates a block diagram of carrier aggregation in accordance with an example.

In one embodiment of carrier aggregation (CA) in the 3GPP LTE standard, component carriers (CCs) for a Universal Mobile Telecommunications System (UMTS) Terrestrial Radio Access Network can be combined together to form a larger bandwidth for the UE, as illustrated in FIG. 2. For example, the UMTS may have a system bandwidth 210 of 100 MHz in a frequency spectrum 216 with each CC 212 having a 20 MHz bandwidth. Each CC may comprise a plurality of subcarriers 214. Some UEs 230 may use the entire 100 MHz system bandwidth by aggregating five 20 MHz CCs together to achieve a 100 MHz UE bandwidth 220.

In another example, two UEs 232a and 232b, each with a 40 MHz bandwidth capability, may each use two 20 MHz CCs together to achieve a 40 MHz UE bandwidth 222 for each UE. In another example, each UE 234a, 234b, 234c, 234d, and 234e may use a single 20 MHz CC to achieve a 20 MHz UE bandwidth 224. The CCs at an eNodeB may be aggregated for some UEs while other UEs may use a single CC during the same interval. For example, one UE with a 40 MHz bandwidth may be configured while three UEs that each use a single 20 MHz CC are employed in a 100 MHz bandwidth system (not shown). Carrier aggregation allows the bandwidth for a UE to be adjusted and adapted by an eNodeB based on the wireless communication system's limitations, the UEs capabilities and bandwidth requirements, the bandwidth available to the system and/or loading of other UEs on the system.

Each UMTS may use a different carrier bandwidth, as illustrated in FIG. 2. For example, the 3GPP LTE Release 8 (Rel-8) carrier bandwidths and Release 10 (Rel-10) CC bandwidths can include: 1.4 MHz 310, 3 MHz 312, 5 MHz 314, 10 MHz 316, 15 MHz 318, and 20 MHz 320. The 1.4 MHz CC can include 6 Resource Blocks (RBs) comprising 72 subcarriers. Each RB can include twelve 15 kHz subcarriers (on the frequency axis) and 6 or 7 orthogonal frequency-division multiplexing (OFDM) symbols per subcarrier. The 3 MHz CC can include 15 RBs comprising 180 subcarriers. The 5 MHz CC can include 25 RBs comprising 300 subcarriers. The 10 MHz CC can include 50 RBs comprising 600 subcarriers. The 15 MHz CC can include 75 RBs comprising 900 subcarriers. The 20 MHz CC can include 100 RBs comprising 1200 subcarriers. These examples are not intended to be limiting. Carrier aggregation can be accomplished using additional schemes with different bandwidths and different numbers of subcarriers in each CC.

Each eNodeB can have a plurality of different carriers. For instance, the eNodeB may have five separate carriers. Each carrier can have a specific bandwidth and center frequency. The carriers may be located in the same frequency band or different frequency bands.

Each available carrier for an eNodeB may be assigned an eNodeB specific carrier index (eNB CI) by the eNodeB. That is, the CI is specific to the eNodeB. If a UE is handed over to another eNodeB, a new eNB CI will be assigned that eNodeB. The eNodeB CI can be used for future referencing by the eNodeB.

When a UE that is configured to operate in a manner that is consistent with the 3GPP LTE Rel 8/9/10 procedures is powered on then the UE is typically configured to scan, select, and attach to one of the available carriers provided by an eNodeB. It can be assumed that all RRC-IDLE mode procedures are handled by each UE consistent with the 3GPP LTE Rel 8/9/10 procedures as well.

The carrier selected by the UE for attachment to the eNodeB can be considered the initial and default carrier, referred to herein as the Primary Component Carrier (PCC). All other carriers used by the eNodeB can be referred to as Secondary Component Carriers (SCC). A UE's PCC may be changed for a variety of purposes. For instance, the PCC may be changed due to load balancing, interference management, or other link level preferences. The change can be effected through the use of RRC level carrier configuration updates without using network level signaling. Additional information regarding carrier aggregation can be obtained in U.S. patent application Ser. No. 12/975,725 filed on Dec. 22, 2010 with a docket number P36467.

Currently, the 3GPP LTE Rel. 10 specification only supports a single cell for DCI format 3/3A. Thus, when SPS is used, and TPC information is communicated via DCI format 3/3A, only a single component carrier can be used. This currently limits applications such as VOIP, which use SPS and TPC, to a single component carrier.

To overcome this limitation, the DCI format 3/3A can be modified to support the use of additional component carriers. By modifying the DCI format 3 and 3A to support additional component carriers, applications that employ SPS can take advantage of the additional bandwidth provided by carrier aggregation.

In one embodiment of the present invention, the DCI format 3/3A can be configured to explicitly adjust the power control for each individual UE. Each UE can be notified by the eNodeB through a TPC-PDCCH-Configuration information element (IE) about which of the bits contained in the TPC are the power adjustment of the UE. In order to support the power adjustment per component carrier for each UE, the TPC-PDCCH-Config IE can be updated to include the carrier index information for multiple component carriers attached to a UE. In one embodiment, each component carrier attached to a UE can be monitored and updated. Alternatively, only active component carriers may be monitored.

For example, FIG. 3 provides one example of a TPC-CA-PDCCH-Config IE that supports all active PCell and SCell combinations for each UE configured to communicate with an eNodeB. The information element is illustrated using Abstract Syntax Notation 1 (ASN.1). ASN.1 is a standardized notation used to describe structures for representing, encoding, transmitting, and decoding data.

In the example of FIG. 3, the power control function can be setup or released using the IE. The TPC-radio network temporary identifier (RNTI) is used for sending TPC commands applicable to either the physical uplink control channel (PUCCH) or the physical uplink shared channel (PUSCH). The TPC-Index value is either a value of N or M, where N represents a two bit power adjustment value described in 3GPP LTE TS 36.212, Section 5.3.3.1.6, and M represents a one bit power adjustment value described in 3GPP LTE TS 36.212, Section 5.3.3.1.7 in the Rel. 10. The parameter TPC-Index can be communicated by higher layers and determines the index to the TPC command for a given UE. With the inclusion of the carrier aggregation (CA) index, the index to the TPC command can be for a given component carrier, based on the component carrier's carrier index (CID) value.

Figure 4:
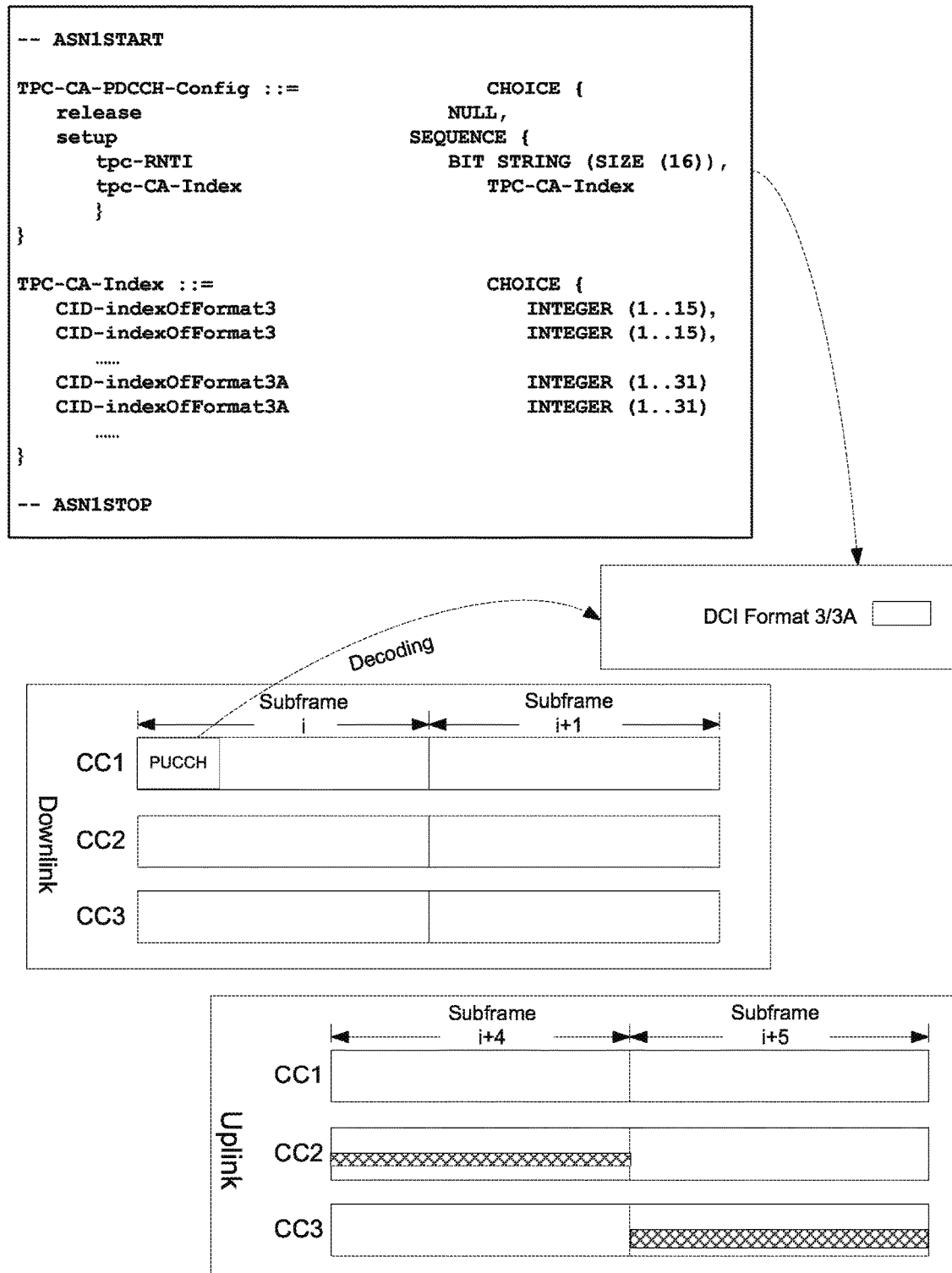
FIG. 4 illustrates a block diagram of an information element to control an uplink power for user equipment using carrier aggregation in accordance with an example.

FIG. 4 shows one example of using the TPC-CA-PDCCH-Config IE of FIG. 3 when communicating between the UE and the eNodeB using frequency division duplexing (FDD) with 3 active component carriers. The active component carriers are illustrated as CC1, CC2, and CC3. Both the uplink and the downlink signals are shown. In this example, information received on the PDCCH in subframe 1 on CC1 can be decoded to determine the TPC-RNTI and TPC-CA-Index. The value of the TPC-CA index may be an "m" or an "n", as previously described with respect to the DCI Formats 3 and 3A, to identify the $m^{th}$ 1 bit (DCI Format 3A) or the $n^{th}$ two bits (DCI Format 3). With three component carriers, there will be a possibility of three different indexOfFormat3 values, and three different indexOfFormat3A values. While specific examples are provided for the use of a single bit power adjustment and a two bit power adjustment, this is not intended to be limiting. In one embodiment, a finer adjustment may be provided, such as 3 or more bits of resolution to adjust the power level.

In FIG. 4, the ASN.1 illustration shows that a CHOICE is to be made based on the TPC-CA-Index value. In the example, information is transmitted on the uplink of the second component carrier in the i+4 subframe. If the second component carrier in the uplink is set for a closed loop power control (CLPC) with DCI format 3, it is the $2^{nd}$ choice and a value of "2" may be sent in the ASN.1 message to identify which CC is set for this power control. If the second CC in the uplink is set for CLPC with format 3A, it is the $5^{th}$ choice (i.e. three CID-indexOfFormat3 variables, followed by two CID-indexOfFormat3A variables with the second ($5^{th}$ in the list) representing CC2). Accordingly, the value of 5 can be set in the ASN.1 message. Similarly, for the next subframe (i+5), the third component carrier may be selected based on a 3 (for DCI format 3) or a 6 (for DCI format 3A) to identify the third component carrier as the component carrier set for CLPC. The information in the uplink subframes can then include an SPS transmission in the PUSCH.

The use of the explicit method described with respect to FIGS. 3 and 4 provides a flexible means to explicitly adjust the power control of each component carrier for each individual UE. However, it also uses additional signaling. In some situations, it may be desirable to communicate less information, while still providing support for component carriers in the DCI Format 3 and 3A.

Accordingly, in another embodiment, an implicit method may be used to identify the TPC index for an SCell without modifying the TPC-PDCCH-Config IE. There are at least three different ways of linking an SCell TPC index to a PCell TPC index.

In a first example, all supported SCells are assigned a default index value assignment based on the PCell TPC index value. For example, a UE may have a PCell and two SCells. The TPC-index value of the PCell is 6 in this example. The TPC-index of the first SCell can use a TPC-index value of 7. The second SCell can use a TPC-index value of 8. The TPC-index value may be assigned to the SCells based on their CID, from smallest to largest. Alternative assignments may also be used, such as largest to smallest, or assigning every other TPC-index value or an $n^{th}$ value (where in is a positive integer) instead of contiguous values. Additional assignment schemes may also be used, as can be appreciated.

In a second example that is similar to the first example, the PCell can be assigned a default TPC index value, following by providing an assignment for all active SCells for a UE. In this case, only active SCells are counted for a TPC-index. For example, a UE may have one PCell and two SCells. The TPC-index value for the PCell may be 6. One of the SCells may be active, while the other is inactive. In this case, the active SCell may have a TPC index value of 7 assigned. When the other SCell moves from an inactive state to an active state, the TPC-index need can be signaled. If the first SCell is still active, the second SCell may be assigned a TPC index value of 8. Alternatively, if the first SCell becomes inactive before the second SCell becomes active, the second SCell may be assigned a TPC index value of 7. As in the first example, the TPC-index value may be assigned to the SCells based on their CID, from smallest to largest. Alternative assignments may also be used, such as largest to smallest, or assigning every other TPC-index value or an $n^{th}$ value (where in is a positive integer) instead of contiguous values. Additional assignment schemes may also be used, as can be appreciated.

In a third example, the PCell and SCell power adjustments may be bundled together. This provides the simplest process for accounting for multiple component carriers and adjusting their power. In this case, all SCells can use the same TPC index value. The same transmit power adjustment as the PCell can be applied to each SCell. However, due to different loading and/or interference configurations in each component carrier, this process may be less effective than the explicit process or the first and second implicit examples.

Figure 5:
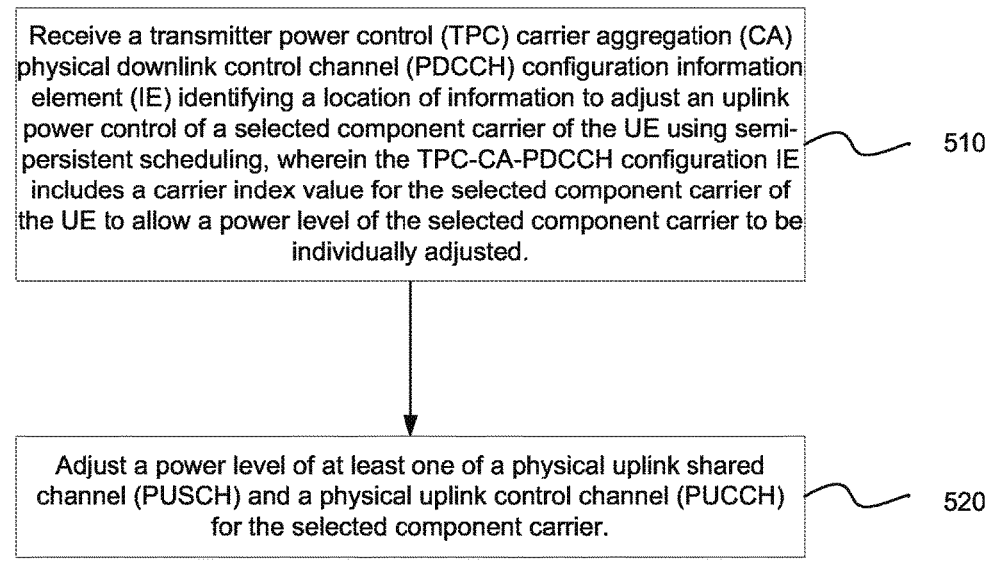
FIG. 5 depicts a flow chart of a method for providing uplink power control signaling of a user equipment (UE) for semi-persistent scheduling with carrier aggregation in accordance with an embodiment of the present invention.

In another embodiment, a method for providing uplink power control signaling of a user equipment (UE) for semi-persistent scheduling with carrier aggregation is disclosed, as depicted in the flow chart of FIG. 5. The method comprises the operation of receiving a transmitter power control (TPC) carrier aggregation (CA) physical downlink control channel (PDCCH) configuration information element (IE) identifying a location of information to adjust an uplink power control of a selected component carrier of the UE using semi-persistent scheduling, as shown in block 510. The TPC-CA-PDCCH configuration IE can include a carrier index value for the selected component carrier of the UE to allow a power level of the selected component carrier to be individually adjusted. The method further comprises adjusting a power level of at least one of a physical uplink shared channel (PUSCH) and a physical uplink control channel (PUCCH) for the selected component carrier, as shown in block 520.

Figure 6:
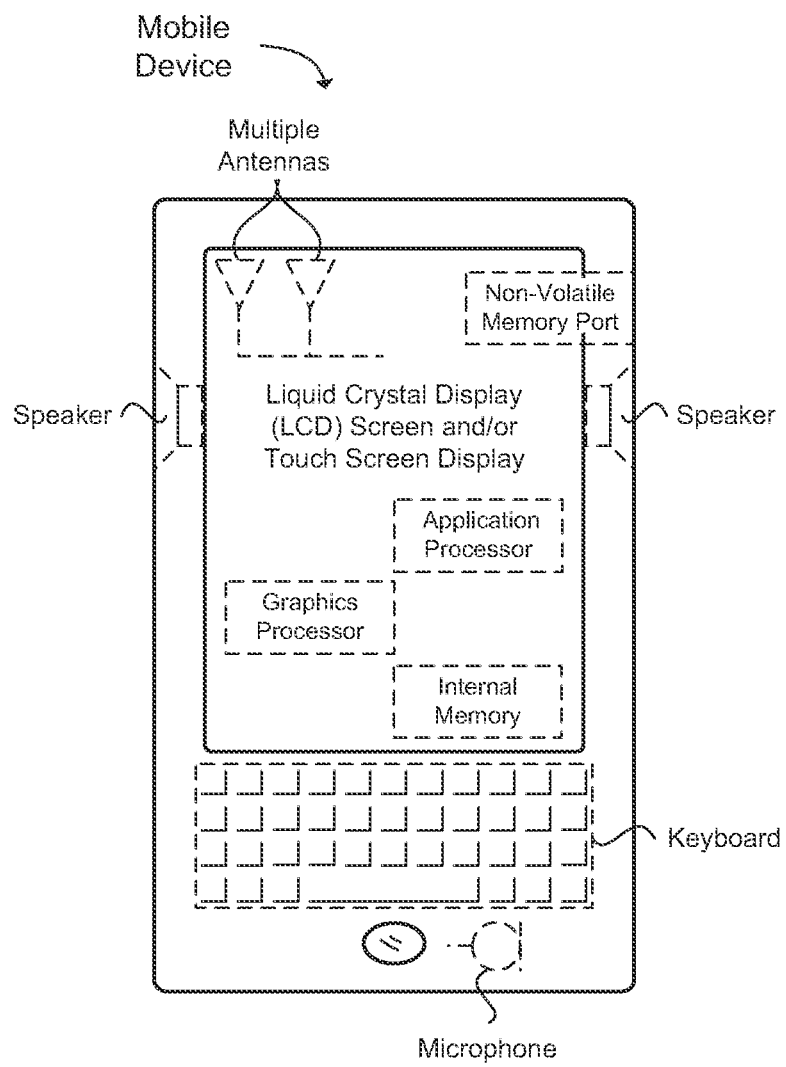
FIG. 6 is a block diagram of a mobile device, in accordance with an example.

FIG. 6 provides an example illustration of the mobile device, such as a user equipment (UE), a mobile station (MS), a mobile wireless device, a mobile communication device, a tablet, a handset, or other type of mobile wireless device. The mobile device can include one or more antennas configured to communicate with a node, macro node, low power node (LPN), or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 6 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) configured to provide uplink power control signaling for semi-persistent scheduling with carrier aggregation, comprising one or more processors and memory configured to:
   receive a transmitter power control (TPC) physical downlink control channel (PDCCH) configuration information element (IE) identifying a TPC index value and a location of information to adjust an uplink power control of a selected component carrier associated with the UE, wherein the UE is configured to provide semi-persistent scheduling;
   assign a TPC index value to each active component carrier based on the TPC index value assigned to the selected component carrier; and
   adjust a power level of at least one of a physical uplink shared channel (PUSCH) and a physical uplink control channel (PUCCH) for the selected component carrier and each active component carrier, wherein a different TPC index value is assigned to each component carrier to identify the selected component carrier and each active component carrier to apply different power level adjustment to the selected component carrier and each active component carrier.

2. The UE of claim 1, wherein a same power level adjustment is applied to the selected component carrier and each active component carrier.

3. The UE of claim 1, wherein, in the TPC-PDCCH configuration IE, a separate single bit power control value and two bit power control value are provided for each active component carrier, wherein one of the single bit power control value and the two bit power control value are identified based on the TPC index value for each active component carrier.

4. A user equipment (UE) configured to provide uplink power control signaling for semi-persistent scheduling with carrier aggregation, comprising one or more processors and memory configured to:
   receive a transmitter power control (TPC) carrier aggregation (CA) physical downlink control channel (PDCCH) configuration information element (IE) identifying a location of information to adjust an uplink power control of a selected component carrier of the UE using semi-persistent scheduling;
   wherein the TPC-CA-PDCCH configuration IE includes a carrier index value for the selected component carrier of the UE to allow a power level of the selected component carrier to be individually adjusted;
   assign a TPC index value to each active component carrier based on a TPC index value assigned to the selected component carrier; and
   adjust a power level of at least one of a physical uplink shared channel (PUSCH) and a physical uplink control channel (PUCCH) for the selected component carrier, wherein a different TPC index value is assigned to each component carrier to identify the selected component carrier and each active component carrier to apply different power level adjustment to the selected component carrier and each active component carrier.

5. The UE of claim 4, wherein the TPC-CA-PDCCH configuration IE is configured to operate based on format 3 or format 3A of a third generation partnership project (3GPP) long term evolution (LTE) downlink control information (DCI).

6. The UE of claim 4, wherein the information to adjust an uplink power control of a selected component carrier is comprised of one of one bit and two bits.

7. The UE of claim 4, wherein the TPC-CA-PDCCH configuration IE includes a carrier index value for each component carrier of the UE.

8. The UE of claim 4, wherein the TPC-CA-PDCCH configuration IE includes a carrier index value for each active component carrier of the UE.

9. The UE of claim 4, wherein the TPC-CA-PDCCH configuration IE includes a carrier index value for each component carrier of the UE and a separate single bit power control value and two bit power control value for each component carrier, wherein the single bit power control value and the two bit power control value are identified based on the carrier index value for each component carrier.

10. The UE of claim 4, wherein the one or more processors and memory are further configured to adjust a power level of at least one of a physical uplink shared channel (PUSCH) and a physical uplink control channel (PUCCH) at each subframe.

11. The UE of claim 4, wherein the one or more processors and memory are further configured to adjust a power level of at least one of a physical uplink shared channel (PUSCH) and a physical uplink control channel (PUCCH) at each persistent physical resource block allocation of the semi-persistent scheduling.

12. At least one non-transitory computer readable medium having instructions stored thereon for providing uplink power control signaling of a user equipment (UE) for semi-persistent scheduling with carrier aggregation, the instructions when executed on a machine to cause the machine to:
  receive a transmitter power control (TPC) carrier aggregation (CA) physical downlink control channel (PDCCH) configuration information element (IE) identifying a location of information to adjust an uplink power control of a selected component carrier of the UE using semi-persistent scheduling, wherein the TPC-CA-PDCCH configuration IE includes a carrier index value for the selected component carrier of the UE to allow a power level of the selected component carrier to be individually adjusted;
  assign a TPC index value to each active component carrier based on a TPC index value assigned to the selected component carrier; and
  adjust a power level of at least one of a physical uplink shared channel (PUSCH) and a physical uplink control channel (PUCCH) for the selected component carrier, wherein a different TPC index value is assigned to each component carrier to identify the selected component carrier and each active component carrier to apply different power level adjustment to the selected component carrier and each active component carrier.

13. The non-transitory computer readable medium of claim 12, the instructions when executed on a machine to cause the machine to:
  receive the TPC-CA-PDCCH configuration IE on a physical downlink control channel (PDCCH) from an eNodeB associated with the selected component carrier.

14. The non-transitory computer readable medium of claim 12, the instructions when executed on a machine to cause the machine to:
  receive the TPC-CA-PDCCH configuration IE, wherein the information to adjust an uplink power control of a selected component carrier of the UE is comprised of one of a single bit and more than one bit.

15. The non-transitory computer readable medium of claim 12, the instructions when executed on a machine to cause the machine to:
  receive in the TPC-CA-PDCCH configuration IE a location of information to adjust an uplink power control of each component carrier of the UE.

16. The non-transitory computer readable medium of claim 12, the instructions when executed on a machine to cause the machine to:
  receive in the TPC-CA-PDCCH configuration IE a location of information to adjust an uplink power control of each active component carrier of the UE.

17. The non-transitory computer readable medium of claim 12, the instructions when executed on a machine to cause the machine to:
  provide, in the TPC-CA-PDCCH configuration IE, a carrier index value for each component carrier of the UE and a separate single bit power control value and two bit power control value for each component carrier, wherein the single bit power control value and the two bit power control value are identified based on the carrier index value for each component carrier.

* * * * *